United States Patent Office 3,275,654
Patented Sept. 27, 1966

3,275,654
1-ISOPROPYLAMINO-2-HYDROXY-3-PHENOXY-PROPANES AND SALTS THEREOF
Max Wilhelm, Allschwil, Hans Ulrich Daeniker, Reinach, Basel-Land, Karl Schenker, Binningen, and Paul Schmidt, Therwil, Switzerland, assignors to Ciba Corporation, New York, N.Y., a corporation of Delaware
No Drawing. Filed Aug. 20, 1965, Ser. No. 481,410
Claims priority, application Switzerland, Sept. 10, 1964, 11,799/64; July 9, 1965, 9,628/65
6 Claims. (Cl. 260—326.14)

The present invention relates to the manufacture of new secondary amines and their salts. Especially it concerns 1 - isopropylamino - 2 - hydroxy - 3 - (ortho-lower alkoxymethylphenoxy)-propanes of the formula

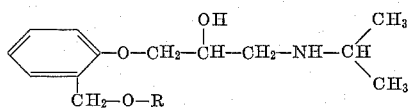

where R represents a lower alkyl radical, such as ethyl, propyl or butyl, or above all the methyl group, and especially of 1 - isopropylamino - 2 - hydroxy-3-(ortho-methoxymethyl-phenoxy)-propane.

The new compounds—especially 1-isopropylamino-2-hydroxy-3-(ortho-methoxymethyl-phenoxy)-propane or 1-isopropylamino - 2 - hydroxy-3-(ortho-n-butoxymethyl-phenoxy) - propane—possess valuable pharmacological properties. Above all, they inhibit adrenergic β-receptors. For example, they inhibit a drop in blood pressure elicited by isoproterenol in the cat narcotised with Dial in a dosage of 0.01 to 1 mg./kg. bodyweight i.v. The compounds can therefore be used as medicaments for the treatment of cardiac and circulatory diseases.

The new compounds are obtained by known methods. Advantageously, a 1-halogeno-2-hydroxy-3-(ortho-lower alkoxymethyl-phenoxy)-propane or 3-(ortho-lower alkoxymethyl-phenoxy)-1,2-epoxypropane is reacted with isopropylamine.

Halogen atoms are above all chlorine, bromine or iodine atoms.

The reaction is performed in the usual manner, advantageously in the presence of a basic condensing agent or of an excess of amine.

The starting materials are known or can be manufactured by known methods.

Depending on the reaction conditions and starting materials used the final products are obtained in the free form or in the form of their salts which are likewise included in the present invention. The salts of the final products can be converted into the free bases in known manner, for example with alkalies or ion exchange resins. When the bases are reacted with organic or inorganic acids, especially those which are suitable for forming therapeutically useful salts, they yield salts. As such acids there may be mentioned for example: Hydrohalic, sulphuric, phosphoric acids, nitric, perchloric acid; aliphatic, alicyclic, aromatic or heterocyclic carboxylic or sulphonic acids such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic acid, embonic, methanesulphonic, ethanesulphonic, hydroxyethanesulphonic, ethylenesulphonic acid; halobenzenesulphonic, toluenesulphonic, naphthalenesulphonic acid or sulphanilic acid; methionine, tryptophan, lysine or arginine.

These and other salts of the new compounds, for example the picrates, may also be used for purifying the resulting free bases, by converting the free base into a salt, separating it and liberating the base from the salt. In view of the close relationship of the new compounds in the free form and in the form of their salts what has been said above and below with regard to the free bases relates similarly and where suitable also to the corresponding salts.

The invention includes also any variant of the present process in which an intermediate obtained at any stage of the process is used as starting material and any remaining step/steps is/are carried out or the process is discontinued at any stage thereof, or in which the starting materials are formed in situ or, if desired, the reactants are used in the form of their salts.

The new compounds may be in the form of their racemates or in the form of antipodes. The racemate can be resolved into its antipodes in the known manner.

The new compounds may be used, for example, in the form of pharmaceutical preparations which contain them in the free form or in the form of their salts in conjunction or admixture with an organic or inorganic, solid or liquid pharmaceutical excipient suitable for enteral or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycols, white petroleum jelly or other known medicinal excipients. The pharmaceutical preparations may be, for example, tablets, dragées or capsules, or in liquid form solutions, suspensions or emulsions. They may be sterilised and/or contain auxiliaries such as preserving, stabilising, wetting or emulsifying agents, solution promoters or salts for regulating the osmotic pressure or buffers. They may also contain further therapeutically valuable substances. The pharmaceutical preparations are formulated by known methods.

The following examples illustrate the invention.

*Example 1*

A solution of 17 g. of 3-(ortho-methoxymethyl-phenoxy)-1,2-epoxypropane in 20 ml. of ethanol is mixed with 17 g. of isopropylamine and refluxed for 4 hours. The solvent and the excess amine are then distilled off in a water-jet vacuum, to leave 1-isopropylamino-2-hydroxy-3-(ortho-methoxymethyl-phenoxy)-propane of the formula

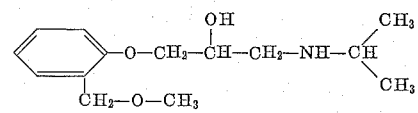

which melts at 49° to 50° C. after recrystallisation from petroleum ether.

The starting material is prepared thus:
A mixture of 32 g. of 2-methoxymethylphenol, 32 g. of epichlorohydrin, 32 g. of anhydrous potassium carbonate and 200 ml. of acetone is stirred and heated for 12 hours at the boil. The potassium carbonate is then filtered off and the filtrate distilled, first under atmospheric pressure and then under vacuum.

3 - (ortho - methoxymethyl - phenoxy) - 1,2 - epoxypropane boils and passes over at 156° to 160° C. under 11 mm. Hg pressure.

*Example 2*

Tablets containing 20 mg. of active substance are prepared with the following ingredients:

| | Mg. |
|---|---|
| 1 - isopropylamino - 2 - hydroxy - 3 - (ortho - methoxymethyl-phenoxy)-propane | 20 |
| Starch | 60 |
| Lactose | 50 |
| Colloidal silicic acid | 5 |
| Talc | 9 |
| Magnesium stearate | 1 |
| | 145 |

Example 3

For the preparation of capsules the following mixture is used:

|  | G. |
|---|---|
| 1 - isopropylamino - 2 - hydroxy - 3 - (ortho - methoxymethyl-phenoxy)-propane | 2500 |
| Talc | 80 |
| Colloidal silicic acid | 20 |

The active ingredient is intimately mixed with talc and colloidal silicic acid, the mixture passed through a sieve (0.5 mm. mesh) and filled in portions of 21 mg. into hard gelatine capsules of a suitable size.

Example 4

A solution of 25 g. of 3-(ortho-n-butoxymethyl-phenoxy)-1,2-epoxypropane and 25 g. of isopropylamine in 25 ml. of ethanol is boiled under reflux for 4 hours. Excess amine and solvent are removed at a water-jet vacuum. The residue is dissolved in 2 N hydrochloric acid and extracted with ether. The aqueous layer is separated, rendered alkaline with sodium hydroxide solution and extracted with ether. After drying and evaporating the solvent, 1 - isopropylamino - 2 - hydroxy - 3 - (ortho-n-butoxymethyl-phenoxy)-propane of the formula

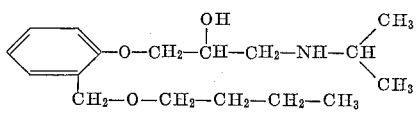

distills at 130–135° C. under 0.02 mm. pressure of mercury and melts at 40–45° C.

The 3 - (ortho - n - butoxymethyl - phenoxy) - 1,2-epoxypropane used as starting material may be prepared as follows:

40 g. of saligen are heated in an autoclave with 200 ml. of n-butanol for 5 hours at 160° C. The reaction product is distilled in vacuo, ortho-(n-butoxymethyl)-phenol passing over at 122° C.

38 g. of ortho-(n-butoxymethyl)-phenol, 38 g. of epichlorhydrin, 38 g. of potassium carbonate and 200 ml. of actone are heated at the boil for 12 hours with stirring. The potassium carbonate is filtered off, and the filtrate is distilled. 3-(ortho-n-butoxymethyl-phenoxy)-1,2-epoxypropane boils at 100–110° C. under 0.08 mm. pressure of mercury.

Example 5

The new compounds can be used in the form of pharmaceutical preparations containing them in admixture or conjunction with vasodilative especially coronary-dilative, compounds, primarily vasodilative esters of nitrous or nitric acid, above all nitro-glycerin, penta-erythritol-tetranitrate, triethanolamine trinitrate, nitromannitol, and/or papaverine, theobromine, theophylline, hydroxyethyl-theophylline, dihydroxy-propyltheophylline, and/or other coronary-dilative derivatives of theobromine or theophylline, and/or 2-ethyl-3(3′,5′-diiodo-4′-hydroxybenzoyl) - benzofuran, 2,6 - bis - (diethanolamino) - 4,8-dipiperidino - pyrimido(5,4 - d)pyrimidine and/or N - 3′-phenyl-propyl-(2′)-1,1-diphenylpropyl-(3)-amine and/or adenosine.

The tablets are formulated so that the daily dose amounts to 5–50 mg. of 1-isopropylamino-2-hydroxy-3-(ortho-methoxymethyl-phenoxy)-propane and 5–50 mg. of penta-erythritol tetranitrate, advantageously with three administrations per day.

What is claimed is:

1. A compound of formula

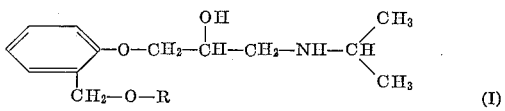

in which R represents a lower alkyl radical.

2. An acid addition salt of a compound claimed in claim 1.

3. 1 - isopropylamino - 2 - hydroxy - 3 - (ortho - methoxymethyl-phenoxy)-propane of the formula

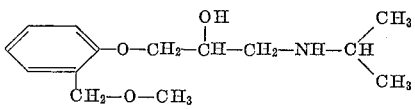

4. 1 - isopropylamino - 2 - hydroxy - 3 - (ortho - n-butoxymethyl-phenoxy)-propane of the formula

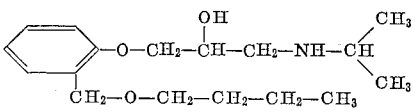

5. An acid addition salt of 1-isopropylamino-2-hydroxy-3-(ortho-methoxymethyl-phenoxy)-propane.

6. An acid addition salt of 1-isopropylamino-2-hydroxy-3-(ortho-n-butoxymethyl-phenoxy)-propane.

No references cited.

CHARLES B. PARKER, *Primary Examiner.*

R. V. HINES, *Assistant Examiner.*